(12) United States Patent
Yamaguchi

(10) Patent No.: US 11,886,742 B2
(45) Date of Patent: Jan. 30, 2024

(54) MEMORY SYSTEM CONTROL METHOD FOR POWER-LEVEL STATE OF A HOST VIA PCIE BUS INCLUDING RECEIVING OPTIMIZED BUFFER FLUSH/FILL (OBFF) MESSAGES OVER THE PCIE BUS

(71) Applicant: KIOXIA CORPORATION, Tokyo (JP)

(72) Inventor: Takashi Yamaguchi, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/500,170

(22) Filed: Oct. 13, 2021

(65) Prior Publication Data
US 2022/0043605 A1 Feb. 10, 2022

Related U.S. Application Data

(63) Continuation of application No. 16/806,730, filed on Mar. 2, 2020, now Pat. No. 11,175,858.

(30) Foreign Application Priority Data

Sep. 26, 2019 (JP) ................. 2019-176092

(51) Int. Cl.
*G06F 3/06* (2006.01)
*G06F 13/16* (2006.01)
*G06F 13/42* (2006.01)

(52) U.S. Cl.
CPC .......... *G06F 3/0659* (2013.01); *G06F 3/0604* (2013.01); *G06F 3/0679* (2013.01); *G06F 13/1668* (2013.01); *G06F 13/4282* (2013.01); *G06F 2213/0026* (2013.01)

(58) Field of Classification Search
CPC .. G06F 3/0659; G06F 3/0679; G06F 13/1668; G06F 1/4282
See application file for complete search history.

(56) References Cited

U.S. PATENT DOCUMENTS

| | | | |
|---|---|---|---|
| 6,792,483 B2 | 9/2004 | Schmidt | |
| 9,891,686 B2 * | 2/2018 | Jurski | ........... G06F 1/30 |
| 10,102,162 B2 | 10/2018 | Lee | |
| 10,970,235 B2 | 4/2021 | Hong et al. | |
| 11,175,858 B2 * | 11/2021 | Yamaguchi | ......... G06F 13/1668 |
| 2016/0062698 A1 * | 3/2016 | Wu | ............ G06F 3/0658 |
| | | | 714/6.2 |
| 2016/0162421 A1 | 6/2016 | Xiong et al. | |

(Continued)

FOREIGN PATENT DOCUMENTS

| | | |
|---|---|---|
| CN | 107967221 A | 4/2018 |
| CN | 110073323 A | 7/2019 |
| TW | 201426305 A | 7/2014 |

*Primary Examiner* — Tammara R Peyton
(74) *Attorney, Agent, or Firm* — Kim & Stewart LLP

(57) ABSTRACT

According to one embodiment, a memory system is capable of being connected to a host. The memory system includes a nonvolatile memory and a controller that receives information regarding an operating state of the host. The controller controls the nonvolatile memory according to commands from the host and selects a parameter for interrupt coalescing for transmissions to the host of interrupts related to command completion notices for the commands from the host based on the information regarding the operating state of the host.

14 Claims, 6 Drawing Sheets

(56) References Cited

U.S. PATENT DOCUMENTS

2017/0336988 A1 11/2017 Kim et al.
2018/0341410 A1 11/2018 Benisty
2020/0117623 A1 4/2020 Han et al.

* cited by examiner

| | +0 | +1 | +2 | +3 |
|---|---|---|---|---|
| Byte0> | Fmt 0 0 1 / Type Field | T9 / TC / T8 / Attr / R / TH | TD / EP / Attr / R | Length |
| Byte4> | Requester ID | | Tag | Message Code |
| Byte8> | Reserved | | Reserved | |
| Byte12> | Reserved | | Reserved | OBFF Code |

MEMORY SYSTEM CONTROL METHOD FOR POWER-LEVEL STATE OF A HOST VIA PCIE BUS INCLUDING RECEIVING OPTIMIZED BUFFER FLUSH/FILL (OBFF) MESSAGES OVER THE PCIE BUS

CROSS-REFERENCE TO RELATED APPLICATIONS

This application is a continuation of U.S. patent application Ser. No. 16/806,730, filed on Mar. 2, 2020, which is based upon and claims the benefit of priority from Japanese Patent Application No. 2019-176092, filed Sep. 26, 2019, the entire contents of each of which are incorporated herein by reference.

FIELD

Embodiments described herein relate generally to a memory system, a memory system control method, and an information processing system.

BACKGROUND

A solid-state drive (SSD) equipped with a non-volatile semiconductor memory, such as a NAND flash memory, is a known memory system. In some examples, a SSD can be connected to various computers and used as an external storage device.

DETAILED DESCRIPTION

Figure 1:
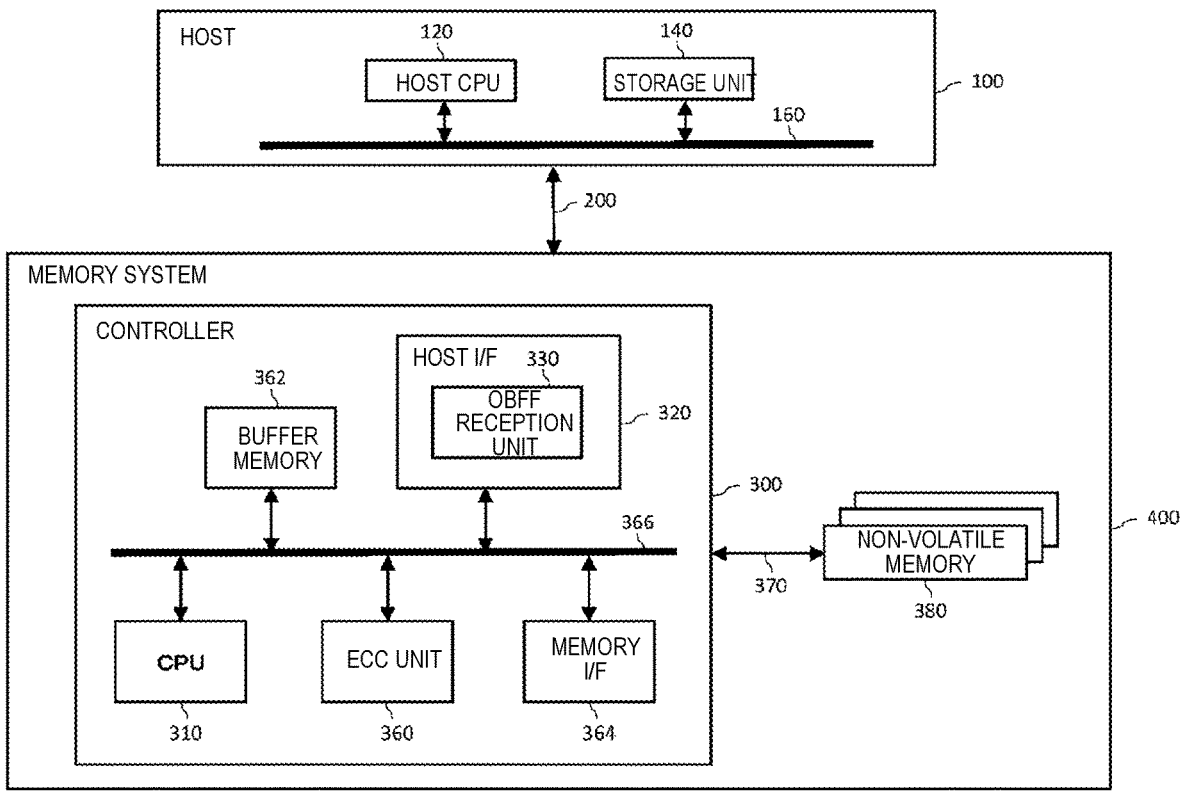
FIG. 1 depicts a memory system, according to a first embodiment, connected to an external host and including a controller and a non-volatile memory.

Embodiments provide a memory system, a memory system control method, and an information processing system that can reduce power consumption.

In general, according to one embodiment, a memory system is capable of being connected to a host. The memory system includes a nonvolatile memory and a controller that receives information regarding an operating state of the host. The controller controls the nonvolatile memory according to commands from the host and selects a parameter for interrupt coalescing for transmissions to the host of interrupts related to command completion notices for the commands from the host based on the information regarding the operating state of the host.

Hereinafter, example embodiments will be described with reference to drawings. In the following description, those components having the same function and configuration are denoted by the same reference numerals. In addition, each example embodiment discussed corresponds to an apparatus and a method embodying a technical concept or concepts of the present disclosure and should not be considered a limitation of the present disclosure to the specific materials, shapes, structures, physical arrangements, or the like of the various component parts described as examples.

Furthermore, each described functional block may be implemented by hardware, computer software, or a combination of both. Thus, in this description disclosed functions of a block should be considered as being accomplished with hardware, computer software, or some combination of both. It is generally not essential that each described functional block of an example embodiment be readily distinguishable in an actual implantation of the present disclosure. For example, some functions attributed to a specific functional block in an embodiment may be executed in cooperation or combination with another functional block different from that illustrated as an example. Furthermore, in some instances, a disclosed functional block may be divided into smaller functional sub-blocks.

First Embodiment

FIG. 1 is a block diagram illustrating an example of the overall configuration of a memory system 400 according to a first embodiment. The memory system 400 includes a controller 300 and a non-volatile memory 380 and is connected to an external host 100.

As shown in FIG. 1, the host 100 and the memory system 400 are connected by a PCI Express® bus 200. PCI Express® is also referred to as PCIe® in some instances. For simplicity, PCI Express® bus 200 will generally be referred to as "PCIe bus 200." In the following example, the memory system 400 is a solid-state drive (SSD) and operates with a host 100 conforming to the non-volatile memory express (NVMe) standard.

The host 100 is a computer such as a personal computer, a portable computer, or a portable communication device. The host 100 includes a host central processing unit (CPU) 120 and a storage unit 140, which are connected via a host-side internal bus 160 (hereinafter, referred to as a host bus 160). The host CPU 120 performs processing according to a program loaded in the storage unit 140. The storage unit 140 is configured from a non-volatile memory such as a read only memory (ROM) that stores a program used by the host CPU 120, a volatile memory such as a random access memory (RAM) in which a program to be executed by the host CPU 120 is loaded or data is temporarily stored, and the like.

For a PCIe bus 200, an optimized-buffer-flush/fill (OBFF) for notifying the operational status of the host 100 is standardized. There are three types of operational statuses for the host 100: active, OBFF, and idle. "Active" is a state in which the host 100 is actively operating (e.g., busy). In the "OBFF" state, the host CPU 120 is in a low power consumption status, but the storage unit 140 can still be accessed. "Idle" is a low power consumption status in which the entire host 100 is inactive.

The memory system 400 has a configuration in which the controller 300 and the non-volatile memory 380 are connected via a memory bus 370. At least one non-volatile memory 380 is provided, but the total number thereof is not limited and a plurality may be provided.

The controller 300 controls writing/reading of data to/from the non-volatile memory 380 in accordance with a command from the host 100. In some instances, a command may be otherwise referred to as an instruction or a request, for example. The controller 300 is a semiconductor integrated circuit configured as a system on a chip (SoC), a field-programmable gate array (FPGA), or an application specific integrated circuit (ASIC), for example. A part or all of the functions of each component of the controller 300 described below may be implemented by a central processing unit (CPU) executing firmware or may be implemented by hardware circuitry of the like.

The non-volatile memory 380 is a semiconductor memory that can store data in a non-volatile manner. The non-volatile memory 380 may be, for example, a NAND flash memory. In the NAND flash memory, data is written and read in units of pages. In the NAND flash memory, data is erased in units of blocks. When the NAND flash memory is used for the non-volatile memory 380, the memory cells of the NAND flash memory may each be a single level cell capable of storing 1 bit or a multi-level cell capable of storing 2 bits or more.

The non-volatile memory 380 may include a plurality of memory chips that can operate independently from each other, for example.

In the first embodiment, an example in which a NAND flash memory is used as the non-volatile memory 380 will be described. In other examples, the non-volatile memory 380 can be or comprise a storage means other than a NAND flash memory, such as a three-dimensional structure flash memory, resistance random access memory (ReRAM), ferroelectric random access memory (FeRAM), or magnetoresistive random access memory (MRAM). In the present embodiment, the non-volatile memory 380 is a semiconductor-type memory, but in other examples a storage type or means other than a semiconductor-type memory may be used.

The memory bus 370 connects the controller 300 and the non-volatile memory 380. The memory bus 370 conforms to, for example, toggle double data rate (DDR) and open NAND flash interface (ONFI).

Next, a detailed configuration of the controller 300 will be described. As shown in FIG. 1, the controller 300 has a configuration in which a CPU 310, a host interface 320 (host I/F 320), an error check and correction unit 360 (ECC unit 360), a buffer memory 362, and a memory interface 364 (memory I/F 364) are connected to each other via an internal bus 366.

The CPU 310 comprehensively controls each component of the memory system 400. When the memory system 400 is booted up, the CPU 310 reads firmware (or other control program) stored in a ROM (not shown) onto the buffer memory 362 or the RAM (not shown) in the CPU 310. Thereafter, each function which has to be controlled is implemented by the CPU 310 executing the firmware.

When receiving commands from the host 100 via the host interface 320, the CPU 310 controls each unit of the controller 300 according to the commands. For example, the CPU 310 instructs the memory interface 364 to write data to the non-volatile memory 380 in accordance with a write command from the host 100. Further, the CPU 310 instructs the memory interface 364 to read data from the non-volatile memory 380 in accordance with a read command from the host 100.

When the CPU 310 receives the next write command from the host 100, the CPU 310 saves the data specified by the previous write command in the buffer memory 362 and selects a storage area on the non-volatile memory 380 for this data. That is, the CPU 310 determines and manages a data write destination. The correspondence between the logical address of the data received from the host 100 and a physical address corresponding to the data storage area on the non-volatile memory 380 is stored as an address conversion table in the buffer memory 362.

When the CPU 310 receives a read command from the host 100, the CPU 310 converts the logical address specified by the read command into the physical address by using the above-described address conversion table and instructs the memory interface 364 to read data from the physical address of the non-volatile memory 380. As a result, the data read from the non-volatile memory 380 is temporarily stored in the buffer memory 362 and then subsequently transmitted to the host 100 via the host interface 320.

The host interface 320 outputs commands, write data, and the like received from the host 100 to the internal bus 366 and stores the commands, write data, and the like in the buffer memory 362. The host interface 320 transmits read data that has been read from the non-volatile memory 380 and then stored in the buffer memory 362, and also a response from the CPU 310 to the host 100.

The ECC unit 360 is, for example, an encoding/decoding circuit having an error correction function and encodes data to be written into the non-volatile memory 380 with an error correction code such as a Bose Chaudhuri Hocquenghem (BCH) code. Thus, an error in the data read from the non-volatile memory 380 can be corrected.

Data received as write data by the host interface 320 from the host 100 is temporarily stored in the buffer memory 362. The CPU 310 selects a storage area of the non-volatile memory 380 for the data from the buffer memory 362 to be stored and instructs the memory interface 364 to write the data in the selected storage area.

As the buffer memory 362, a volatile memory such as a dynamic random-access memory (DRAM) or a static random-access memory (SRAM) may be used. The buffer memory 362 may be mounted inside the controller 300 or may be mounted outside the controller 300.

The memory interface 364 controls processing for writing data to the non-volatile memory 380 and processing for reading data from the non-volatile memory 380 based on instructions from the CPU 310.

The internal bus 366 is a communication line that connects the CPU 310, the host interface 320, the ECC unit 360, the buffer memory 362, and the memory interface 364.

Figure 2:
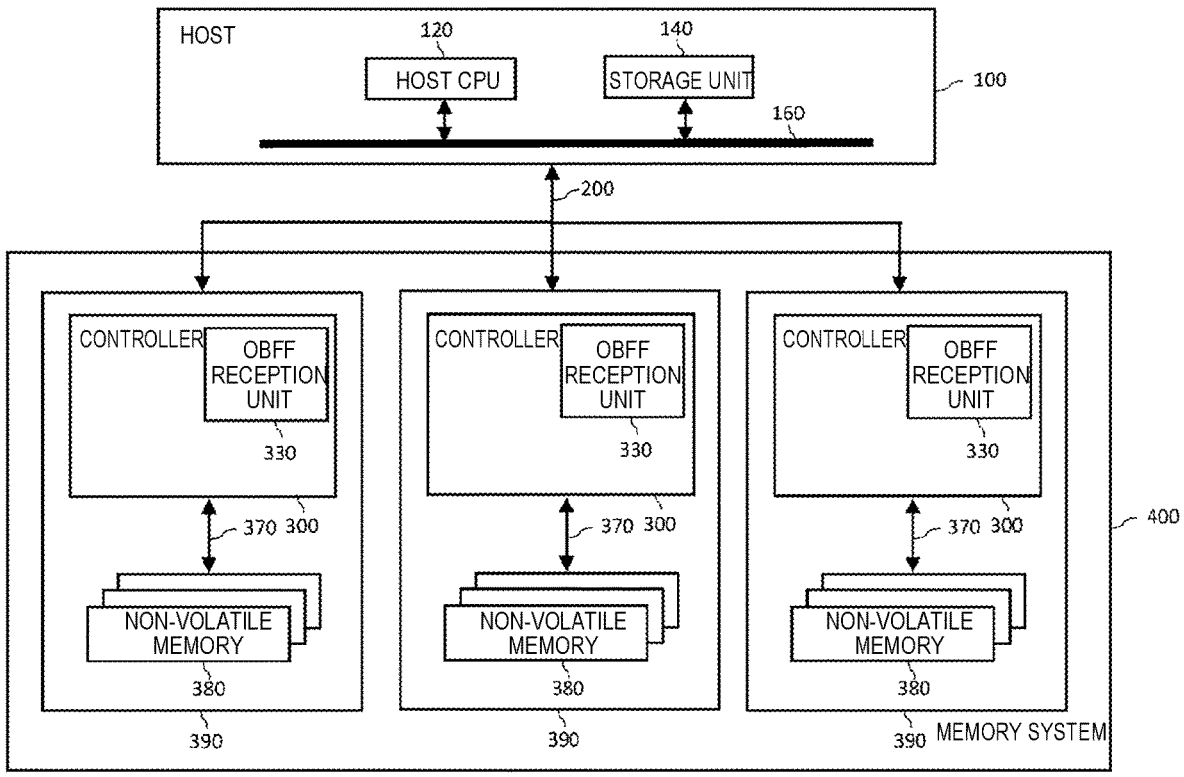
FIG. 2 depicts a memory system according to a first embodiment including a plurality of memory chips.

FIG. 2 is a block diagram illustrating an example in which the memory system 400 according to the first embodiment is configured from a plurality of chips 390.

As illustrated in FIG. 2, the memory system 400 includes a plurality of chips 390. Each chip 390 is provided with one controller 300 and plural non-volatile memories 380. Further, the host 100 and the controllers 300 are connected by the PCIe bus 200. While FIG. 2 illustrates the case where the memory system 400 includes three chips 390, the number of chips is not limited thereto. Further, when the host 100 and the plurality of controllers 300 are connected by the PCIe bus 200, a switch or a root complex may be used.

Figures 3, 4:
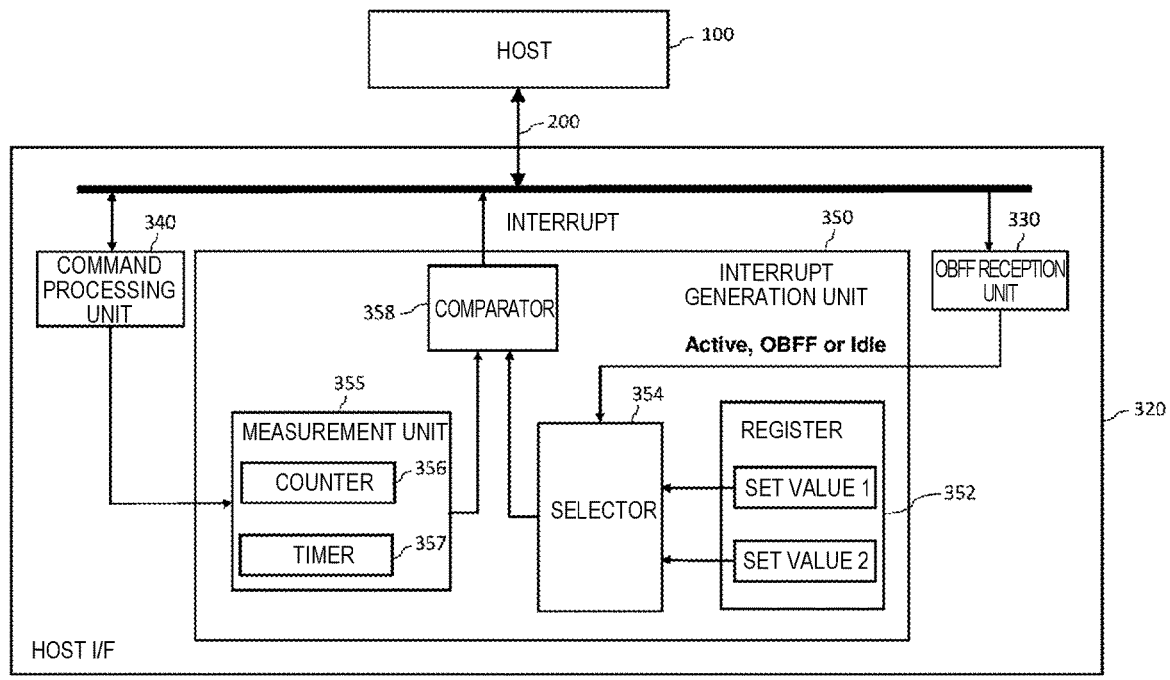
FIG. 3 depicts a host interface in a controller of a memory system according to a first embodiment.
FIG. 4 is an example of an OBFF message header received from a host by an OBFF reception unit of a memory system according to a first embodiment.

FIG. 3 is a block diagram illustrating a configuration example of the host interface 320 between the controller 300 and the external host 100 in the memory system 400 according to the first embodiment. As illustrated in FIG. 3, the host interface 320 includes an OBFF reception unit 330, a command processing unit 340, and an interrupt generation unit 350.

The OBFF reception unit 330 receives an OBFF message, which is information indicating the operational status of the host 100, from the host 100 as a transaction layer packet (TLP). The OBFF reception unit 330 notifies the selector 354, according to the received OBFF message, whether the host 100 is active, OBFF, or idle.

FIG. 4 is an example of the header of an OBFF message used in the memory system 400 according to the first embodiment. In this header, for example, "Type Field" indicating a message TLP is placed in the first bits 0 to 4 of the byte 0 string (Byte 0>), a message code ("Message Code") identifying OBFF is placed in the last bits 0 to 7 of the byte 4 string (Byte 4>), and an OBFF code ("OBFF Code") indicating the status of the host 100 is placed in the last bits 0 to 3 of the byte 12 string (Byte 12>). This OBFF code is set to "0000" when the host 100 is idle, "0001" when the host 100 is OBFF, and "1111" when the host is active.

Here, the description goes back to the host interface 320 in FIG. 3. The command processing unit 340 manages command processing such as writing and reading of data exchanged between the host 100 and the non-volatile memory 380. The commands from the host 100 include, for example, a write command for writing data to the non-volatile memory 380 and a read command for reading data from the non-volatile memory 380. When command processing from the host 100 is completed, the command processing unit 340 notifies a measurement unit 355 provided in the interrupt generation unit 350. In the present embodiment, notifying the completion of command processing to the host 100 is sometimes referred to merely as "completion".

Next, command transmission performed from the host 100 to the controller 300 will be described. When command queues are accumulated in the storage unit 140 of the host 100, a notification is output to the register 352 in the controller 300 from the host 100 via the PCIe bus 200, the register 352 sometimes called as "a doorbell register". When the controller 300 receives the notification to the "doorbell register", the controller 300 reads the command in the storage unit 140. In this way, a command is transmitted from the host 100 to the controller 300. Next, the command processing unit 340 executes a command operation according to the command read from the storage unit 140.

The interrupt generation unit 350 includes a register 352, the selector 354, the measurement unit 355, and a comparator 358.

The register 352 stores a plurality of set values. For example, in FIG. 3, a set value 1 and a set value 2, which larger than the set value 1, are stored in the register 352. The stored number of set values is not a limitation, and, in general, any number of set values may be stored.

The selector 354 receives from the OBFF reception unit 330 an indication as to whether the host 100 is active, OBFF, or idle and selects a set value from the register 352 according to the operational status of the host 100.

In the present embodiment, the selector 354 selects the set value 1 when the host 100 is active and selects the set value 2 when the host 100 is OBFF or idle. In an example, a value of "10" may be the set value 1 and a value of "50" may be the set value 2. In the present embodiment, the selector 354 selects between two possible set values (set value 1 and the set value 2) in the register 352 according to a notification of host 100 operating state. The values in the register 352 can be set by a SetFeature command (conforming to the NVMe standard) received from the host 100. That is, the particular set values which are selected by the selector 354 according to host 100 state may also be changed (in the register 352) by a SetFeature command sent from the host 100, but, in this context, the set value 2 must be larger than the set value 1.

The measurement unit 355 includes a counter 356 and a timer 357 and measures a first condition that is a reference for determining whether or not to transmit an "interrupt" signal (also referred to more simply as an "interrupt" in some contexts) to the host 100. The interrupt signal is generated by the interrupt generation unit 350 and indicates whether or not interruption of the host 100 is being requested. The measurement unit 355 transmits the measured value relating to the first condition to the comparator 358 as a signal. The first condition in the present embodiment is, for example, (a) number of times that command processing is completed, which is notified from the command processing unit 340 or (b) an elapsed time from the completion of first command processing. For example, the number of times that command processing is completed (as notified from the command processing unit 340) is counted by the counter 356, and the counted number is transmitted to the comparator 358. The elapsed time from the completion of the first command processing (as notified from the command processing unit 340) is measured by the timer 357, and the measured time is transmitted to the comparator 358.

Whether the counter 356, the timer 357, or both should be used for setting the first condition can be set in advance by the CPU 310. This setting may possibly be changed by a user.

The comparator 358 provided in the controller 300 compares the set value selected by the selector 354 for a parameter to the value related to the first condition received from the measurement unit 355 and interrupts the host 100 (sends an interrupt) when the value related to the first condition received from the measurement unit 355 has exceeded the set value (parameter value).

For example, the operation of the comparator 358 when the number of times that command processing has been completed, as counted by the counter 356, is equal to a value of "30" will be described.

When the host 100 is active, for example, the value "10" as the set value 1 is selected by the selector 354. Thus, the comparator 358 determines that the number of times that command processing has been completed (value=30) has exceeded the set value and therefore transmits "interrupt" to the host 100.

On the other hand, when the host 100 is OBFF or idle, a value of "50" as the set value 2 is selected by the selector 354. Thus, the comparator 358 determines that the number of times that command processing has been completed has not yet exceeded the set value and therefore does not transmit "interrupt" to the host 100.

Figure 5:
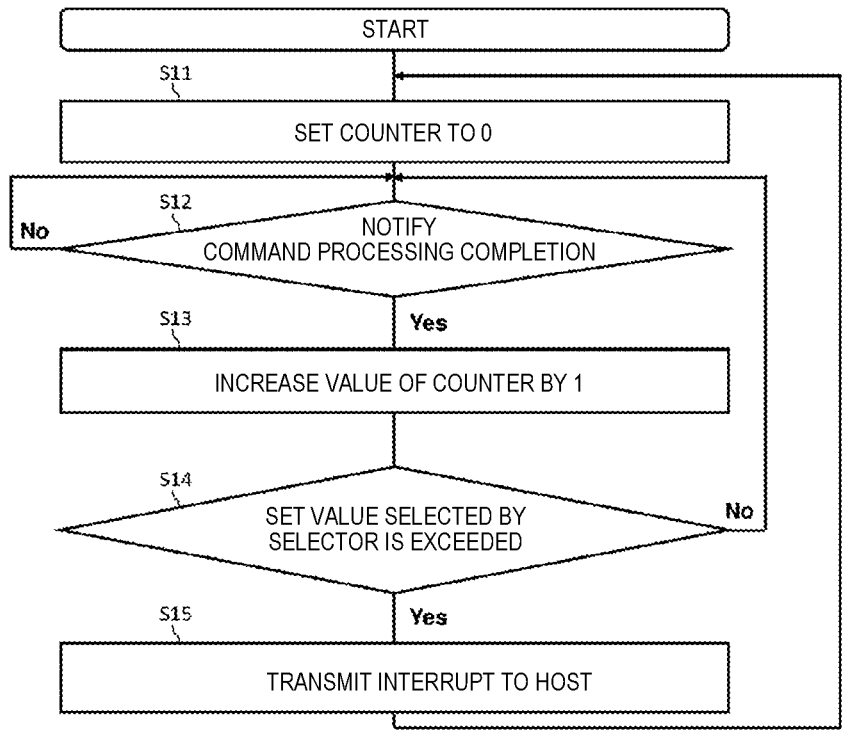
FIG. 5 is a flowchart illustrating aspects of control for a memory system according to a first embodiment utilizing a counter.

FIG. 5 is a flowchart illustrating an example in which the control of the memory system 400 according to the first embodiment is performed by using the counter 356.

First, the counter 356 sets its counter value to "0" (step S11). Next, if receiving a command processing completion notification from the command processing unit 340 (Yes in step S12), the counter 356 increases the value by "1" (step S13). If not receiving any command processing completion notification from the command processing unit 340 (No in step S12), the counter 356 waits until a command processing completion notification is received. Next, when the comparator 358 determines that the value of the counter 356 has exceeded the set value selected by the selector 354 (Yes in step S14), the interrupt generation unit 350 transmits a signal, ("interrupt") to the host 100 (step S15). When the comparator 358 determines that the value of the counter 356 has not exceeded the set value selected by the selector 354 (No in step S14), the interrupt generation unit 350 returns to step S12 and waits for a command processing completion notification. After step S15, the process returns to step S11 and the same processing as described above is performed. As described above, the memory system 400 is controlled.

Figure 6:
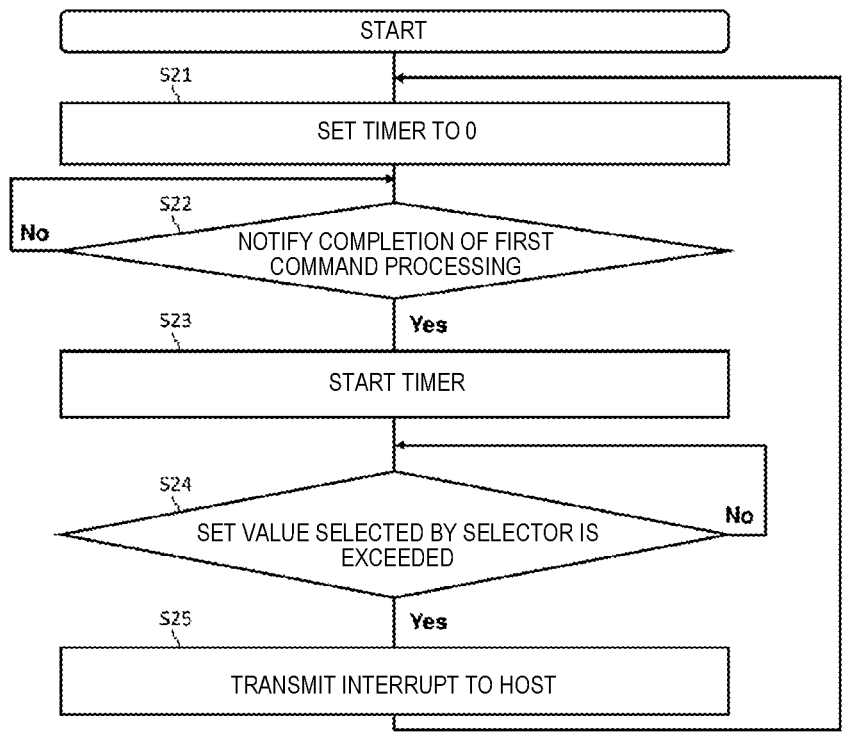
FIG. 6 is a flowchart illustrating aspects of control for a memory system according to a first embodiment utilizing a timer.

FIG. 6 is a flowchart illustrating the memory system 400 according to the first embodiment controlled by using the timer 357.

First, the timer 357 sets the value to its timer value to "0" (step S21). Next, the timer 357 starts upon receiving a notification of the completion of first command processing from the command processing unit 340 (Yes in Step S22) (step S23). If not receiving any notification of the completion of the first command processing from the command processing unit 340 (No in step S22), the timer 357 waits until a notification of the completion of the first command processing is received. Next, when the comparator 358 determines that the value of the timer 357 has exceeded the set value selected by the selector 354 (Yes in step S24), the interrupt generation unit 350 transmits an "interrupt" to the host 100 (step S25). When the comparator 358 determines that the value of the timer 357 has not exceeded the set value selected by the selector 354 (No in step S24), the timer 357 continues to measure the time elapsed from the completion of the first command processing until the set value selected by the selector 354 is finally exceeded. After step S25, the process returns to step S21 and the same processing as described above is performed. As described above, the transmission of interrupts from memory system 400 is controlled.

Figure 7:
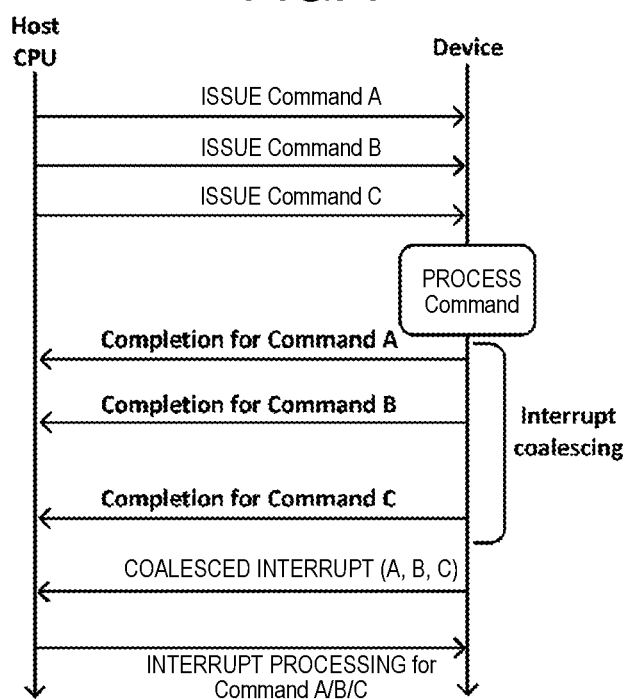
FIG. 7 is a schematic diagram illustrating a type of interrupt coalescing in a memory system of a comparative example.
Figure 8:
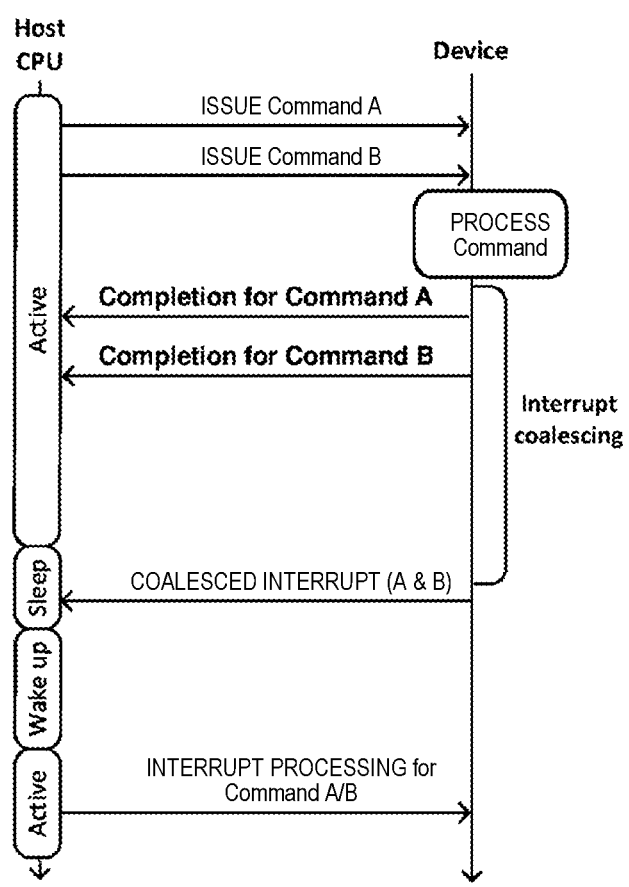
FIG. 8 is a schematic diagram illustrating another type interrupt coalescing in a memory system of a comparative example.

FIGS. 7 and 8 are schematic diagrams illustrating interrupt coalescing in a memory system of a comparative example.

"Interrupt coalescing" is as a technique used to reduce the number of times the host 100 is subjected to interrupt processing. That is, "interrupt coalescing" is the technique for collecting individual "interrupts" associated with different input/output requests that would otherwise each be individually transmitted to the host and transmitting just one interrupt to account for the collected (coalesced) individual interrupts. For example, to reduce the number of interrupt processings, a single interrupt associated with a total of n input/output processings can be transmitted. Alternatively, the input/output processing(s) occurring within some fixed time period since the last (previous) interrupt was transmitted can be collected and then a single interrupt associated with the input/output processing collected during the fixed time period can be transmitted.

In FIG. 7, the command processing completion notification (completions) for commands A, B, and C is performed by a single (coalesced) interrupt processing. That is, the depicted individual command completion notifications in FIG. 7 for each of commands A, B, C that would otherwise be separately transmitted from the memory system 400 to the host 100 are instead combined/coalesced into a single interrupt transmission to the host 100.

With interrupt coalescing in this comparative example, the operational status of the host is not considered with respect to the coalescing process and interrupt transmission and therefore improvements with regard to input/output processing efficiency are possible.

FIG. 8 illustrates another comparative example involving interrupt coalescing. FIG. 8 shows that if the host switches to the low power consumption ("sleep") state, then, in some instances, the interrupt processing associated with the completion for the commands A and B is performed according to a single (coalesced) interrupt transmission may require a return ("Wake up") from the low power consumption state according to an interrupt received by the host while in the low power consumption state. However, in this example, if the host is not changed from the low power consumption state to an operational state ("Active") again, then a notification associated with the interrupt processing would not be transmitted from the host to the memory system, such as a SSD. Thus, the host must consume power during a transition from the low power consumption state to the operational state.

Figure 9:
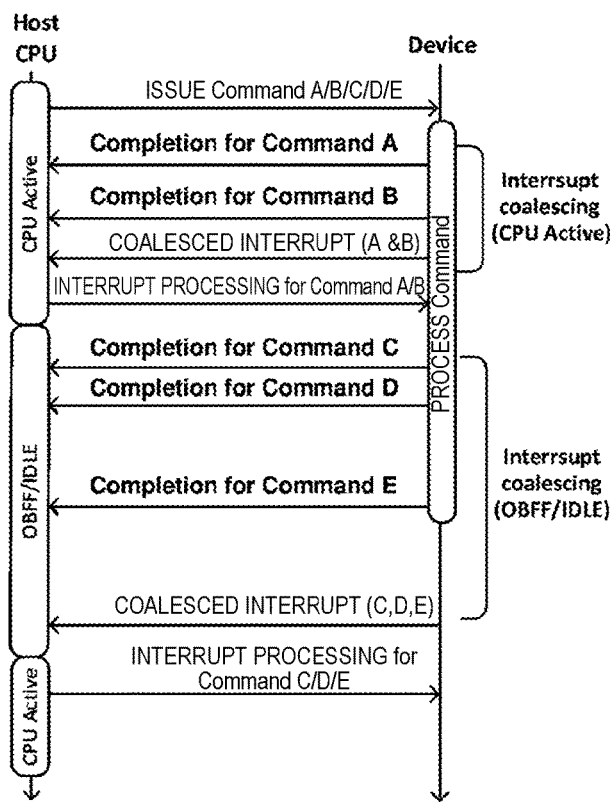
FIG. 9 is a schematic diagram illustrating interrupt coalescing in a memory system according to a first embodiment.

FIG. 9 is a schematic diagram illustrating interrupt coalescing in the memory system 400 of the first embodiment.

In FIG. 9, when the CPU of the host 100 is active, the memory system 400 completes command processing for two commands (command A & command B) and interrupt coalescing is set such that a single interrupt processing is associated with completion of both the commands A & B. On the other hand, when the CPU of the host 100 is OBFF or idle state, the memory system 400 completes command processing for three commands (command C, command D, and command E) and interrupt coalescing is set such that a single interrupt processing is associated with all three commands C, D, and E. That is, in the example shown in FIG. 9, the selector 354 selects a value of "2" as the set value 1 and a value of "3" as the set value 2.

In the memory system 400 according to the first embodiment, when the host 100 is in the low power consumption status, the frequency of "interrupt" requests is reduced as compared to when the host 100 is in the operational state, and thus how often the host 100 must return/transition from the low power consumption state back to the operational status is reduced. Therefore, the power consumption of the host 100 can be reduced.

Furthermore, two set values are utilized in this example, the set value 1 to be used (selected) when the host 100 is in the operational state and the set value 2 to be used (selected) when the host 100 is in the low power consumption state, but both these values are set based on a SetFeature command from the host 100. Therefore, by considering the status of the host 100, it is possible to more efficiently perform interrupt coalescing when the host 100 and the memory system 400 cooperate as described. Therefore, it is possible to reduce the power consumption of the host 100.

Second Embodiment

Figure 10:
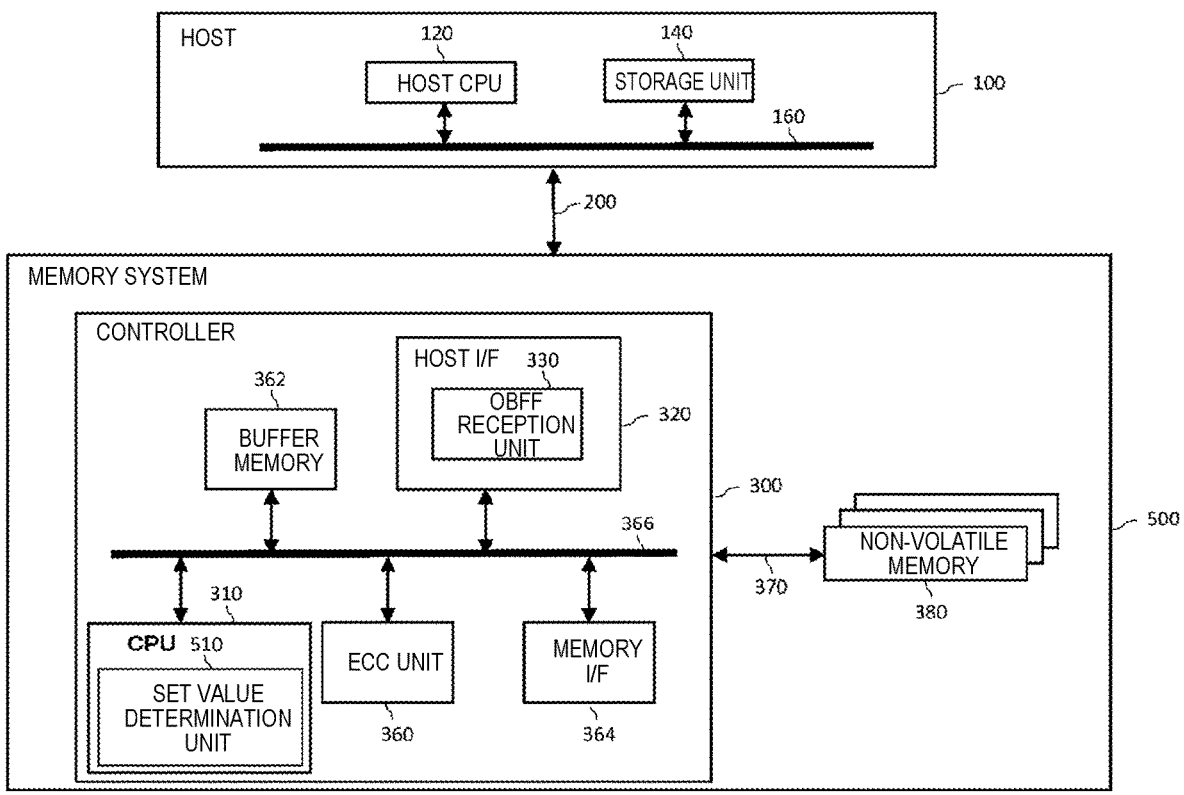
FIG. 10 depicts a memory system, according to a second embodiment, connected to an external host and including a controller and a non-volatile memory.

FIG. 10 is a block diagram illustrating an example of the overall configuration of a memory system 500 according to a second embodiment. The memory system 500 is connected to an external host 100 and includes a controller 300 and a non-volatile memory 380.

The memory system 500 according to the second embodiment is configured similarly to the memory system 400 according to the first embodiment. A point of difference being that the memory system 500 includes a set value determination unit 510. That is, in the memory system 400 according to the first embodiment, the SetFeature command from the host 100 can be used to set values for the two set values (the set value 1 and the set value 2) in the register 352 to be selected between according to host 100 operating state. On the other hand, in the memory system 500 according to the second embodiment, the SetFeature command from the host 100 is used to set only a single set value (a first set value) in the register 352. The set value determination unit 510 provided in the CPU 310 can then be used to set a different set value (a second set value) in the register according to, for example, the value of the set value (the first set value) already received and set in conjunction with the SetFeature command from the host 100 and an indication of the operational state of the host 100. The selector 354 is then controlled to select one of the set values in the register 352 according to the operational status of the host 100.

The set value determination unit 510 can, more broadly, be provided in the controller 300 and it is not necessarily required in all examples to be provided in or by the CPU 310 itself.

In the second embodiment, the set value to be utilized when the host 100 is active is referred to as a set value 1, and the set value to be utilized when the host 100 is OBFF or idle state is referred to as a set value 2.

In the following description, a case where the SetFeature command from the host 100 issues an instruction to set one of the set value 1 or set value 2 in the register 352 to a value "30" will be described. First, the set value determination unit 510 receives from the OBFF reception unit 330 an indication as to whether the host 100 is active, OBFF, or idle. When the SetFeature command sets a value of "30" as the set value 1, the set value determination unit 510 sets a value of "100," for example, as the set value 2. When SetFeature command sets a value of "30" as the set value 2, the set value determination unit 510 sets, for example, a value of "10" as the set value 1. The set value determination unit 510 may operate to change a particular register 352 value/entry that the selector 354 selects or by instructing to selector 354 to select a different value/entry already stored in the register 352 as the appropriate set value 1 or set value 2.

The value of the set values from which the selector 354 selects may be changed by a SetFeature command from the host 100 or by an instruction from the set value determination unit 510, but the value of the set value 2 should be larger than the set value 1. Alternatively, the setting values may be changed by a user or the like.

Also in the memory system 500 according to the second embodiment, the power consumption of the host 100 can be reduced as in the first embodiment. Furthermore, since the controller 300 instructs the selector 354 to select from the register 352 one of two set values, that is, the set value 1 when the host 100 is in an operational state and the set value 2 when the host 100 is in a low power consumption state, it is not necessary to change or vary from the existing NVMe standard.

According to each of the embodiments described above, since interrupts to the host are determined based on whether or not a value relating to a first condition has exceeded a set value selected based on the operational status of the host, it is possible to reduce the power consumption of the host. While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A memory system capable of being connected to a host, the memory system comprising:
   a nonvolatile memory; and
   a controller configured to:
      receive information regarding an operating power-level state of a host,
      control the nonvolatile memory according to commands from the host, and
      select a parameter for interrupt coalescing for transmissions of interrupts from the controller to the host related to command completion notices for the commands from the host based on the information regarding the operating power-level state of the host.

2. The memory system according to claim 1, further comprising:
   a plurality of nonvolatile memories; and
   a plurality of controllers, wherein
   each controller of the plurality of controllers is disposed on a separate chip with at least one nonvolatile memory of the plurality of nonvolatile memories.

3. The memory system according to claim 1, wherein the controller is capable of being connected to the host via a peripheral component interconnect express (PCIe) bus and includes an optimized buffer flush/fill (OBFF) receiver to receive the information.

4. The memory system according to claim 1, wherein the controller is configured to communicate with the host based on a non-volatile memory express (NVMe) standard.

5. The memory system according to claim 1, wherein the parameter for interrupt coalescing is a number of command completion notices to be coalesced.

6. The memory system according to claim 1, wherein the parameter for interrupt coalescing is a length of an elapsed time since a previous transmission to the host of an interrupt.

7. The memory system according to claim 1, wherein the information regarding the operating power-level state of the host indicates the host is in one of an active state, an idle state, or an OBFF state.

8. The memory system according to claim 7, wherein the controller selects the parameter so as to increase a frequency, in time, of transmissions to the host of interrupts related to command completion notices when the information indicates the host is in the active state and to reduce the frequency of transmissions to the host of interrupts related to command completion notices when the information indicates the host is in the OBFF state or idle state.

9. An information processing system, comprising:
   a host device having a plurality of power consumption states;
   a host interface connected to the host device;
   a nonvolatile memory; and
   a controller configured to:
      receive information indicating a present power consumption state of the host device via the host interface,
      control the nonvolatile memory according to commands from the host device, and
      select a parameter for interrupt coalescing for transmissions of interrupts from the controller to the host device related to command completion notices for the commands from the host device based on the information indicating the present power consumption state of the host.

10. The information processing system according to claim 9, wherein the host interface is compatible with a peripheral component interconnect express (PCIe) bus and includes an optimized buffer flush/fill (OBFF) receiver to receive the information.

11. The information processing system according to claim 9, wherein the controller is configured to communicate with the host device via the host interface according to a non-volatile memory express (NVMe) standard.

12. The information processing system according to claim 9, wherein the parameter for interrupt coalescing is a number of command completion notices to be coalesced.

13. The information processing system according to claim 9, wherein the parameter for interrupt coalescing is a length of an elapsed time since a previous transmission to the host of an interrupt.

14. The information processing system according to claim 9, wherein the plurality of power consumption states includes an active state and a low power consumption state.

* * * * *